(12) United States Patent
Merlet

(10) Patent No.: US 9,633,431 B2
(45) Date of Patent: Apr. 25, 2017

(54) FLUOROSCOPIC POSE ESTIMATION

(71) Applicant: COVIDIEN LP, Mansfield, MA (US)

(72) Inventor: Nicolas J. Merlet, Ramot Bet (IL)

(73) Assignee: COVIDIEN LP, Mansfield, MA (US)

( * ) Notice: Subject to any disclaimer, the term of this patent is extended or adjusted under 35 U.S.C. 154(b) by 0 days.

(21) Appl. No.: 14/725,300

(22) Filed: May 29, 2015

(65) Prior Publication Data

US 2016/0005168 A1    Jan. 7, 2016

Related U.S. Application Data

(60) Provisional application No. 62/020,250, filed on Jul. 2, 2014.

(51) Int. Cl.
  *G06K 9/00* (2006.01)
  *G06T 7/00* (2017.01)
  *G06K 9/62* (2006.01)
  *G06T 11/60* (2006.01)
  *G06T 15/08* (2011.01)
  *G06T 19/00* (2011.01)

(52) U.S. Cl.
  CPC .......... *G06T 7/0012* (2013.01); *G06K 9/6202* (2013.01); *G06T 7/0028* (2013.01); *G06T 11/60* (2013.01); *G06T 15/08* (2013.01); *G06T 19/003* (2013.01); *G06T 2200/04* (2013.01); *G06T 2207/10081* (2013.01); *G06T 2207/10121* (2013.01); *G06T 2207/30016* (2013.01); *G06T 2207/30061* (2013.01); *G06T 2207/30196* (2013.01); *G06T 2207/30204* (2013.01); *G06T 2210/41* (2013.01); *G06T 2211/428* (2013.01); *G06T 2219/008* (2013.01); *G06T 2219/2016* (2013.01)

(58) Field of Classification Search
  None
  See application file for complete search history.

(56) References Cited

U.S. PATENT DOCUMENTS

| 4,587,975 A | 5/1986 | Salo et al. |
| 4,593,687 A | 6/1986 | Gray |
| 5,419,324 A | 5/1995 | Dillow |

(Continued)

FOREIGN PATENT DOCUMENTS

| CA | 2655001 A1 | 8/2010 |
| DE | 10323008 A1 | 12/2004 |
| WO | 2012177470 A1 | 12/2012 |

OTHER PUBLICATIONS

European Search Report dated Dec. 18, 2015, issued in EP 15174733.

*Primary Examiner* — Nancy Bitar

(57) ABSTRACT

Methods and systems for registering three-dimensional (3D) CT image data with two-dimensional (2D) fluoroscopic image data using a plurality of markers are disclosed. In the methods and systems, a lateral angle and a cranial angle are searched for and a roll angle is computed. 3D translation coordinates are also computed. The calculated roll angle and 3D translation coordinates are computed for a predetermined number of times successively. After performing the calculations, the 3D CT image data is overlaid on the 2D fluoroscopic image data based on the lateral angle, the cranial angle, the roll angle, and the 3D translation coordinates.

11 Claims, 8 Drawing Sheets

(56) References Cited

U.S. PATENT DOCUMENTS

| | | |
|---|---|---|
| 5,797,849 A | 8/1998 | Vesely et al. |
| 5,951,475 A | 9/1999 | Gueziec et al. |
| 6,028,912 A | 2/2000 | Navab |
| 6,167,296 A | 12/2000 | Shahidi |
| 6,314,310 B1 | 11/2001 | Ben-Haim et al. |
| 6,351,513 B1 | 2/2002 | Bani-Hashemi et al. |
| 6,351,573 B1 | 2/2002 | Schneider |
| 6,381,483 B1 | 4/2002 | Hareyama et al. |
| 6,389,104 B1 | 5/2002 | Bani-Hashemi et al. |
| 6,424,731 B1 | 7/2002 | Launay et al. |
| 6,470,207 B1 | 10/2002 | Simon et al. |
| 6,520,934 B1 | 2/2003 | Lee et al. |
| 6,535,756 B1 | 3/2003 | Simon et al. |
| 6,539,127 B1 | 3/2003 | Roche et al. |
| 6,628,977 B2 | 9/2003 | Graumann et al. |
| 6,714,810 B2 | 3/2004 | Grzeszczuk et al. |
| 6,725,080 B2 | 4/2004 | Melkent et al. |
| 7,010,080 B2 | 3/2006 | Mitschke et al. |
| 7,033,325 B1 | 4/2006 | Sullivan |
| 7,321,677 B2 | 1/2008 | Evron et al. |
| 7,327,872 B2 | 2/2008 | Vaillant et al. |
| 7,356,367 B2 | 4/2008 | Liang et al. |
| 7,467,007 B2 | 12/2008 | Lothert |
| 7,499,743 B2 | 3/2009 | Vass et al. |
| 7,505,809 B2 | 3/2009 | Strommer et al. |
| 7,587,074 B2 | 9/2009 | Zarkh et al. |
| 7,689,019 B2 | 3/2010 | Boese et al. |
| 7,697,972 B2 | 4/2010 | Verard et al. |
| 7,742,629 B2 | 6/2010 | Zarkh et al. |
| 7,761,135 B2 | 7/2010 | Pfister et al. |
| 7,778,685 B2 | 8/2010 | Evron et al. |
| 7,853,061 B2 | 12/2010 | Gorges et al. |
| 7,941,000 B2 | 5/2011 | Rongen et al. |
| 7,991,450 B2 | 8/2011 | Virtue et al. |
| 7,995,819 B2 | 8/2011 | Vaillant et al. |
| 8,098,914 B2 | 1/2012 | Liao et al. |
| 8,126,241 B2 | 2/2012 | Zarkh et al. |
| 8,180,132 B2 | 5/2012 | Gorges et al. |
| 8,218,843 B2 | 7/2012 | Edlauer et al. |
| 8,238,625 B2 | 8/2012 | Strommer et al. |
| 8,270,691 B2 | 9/2012 | Xu et al. |
| 8,295,577 B2 | 10/2012 | Zarkh et al. |
| 8,300,907 B2 * | 10/2012 | Nagamine ............ A61N 5/1048 128/920 |
| 8,346,344 B2 | 1/2013 | Pfister et al. |
| 8,358,874 B2 | 1/2013 | Haras |
| 8,504,588 B2 | 8/2013 | Hirschbeck et al. |
| 8,625,865 B2 | 1/2014 | Zarkh et al. |
| 8,625,869 B2 | 1/2014 | Harder et al. |
| 8,977,026 B2 * | 3/2015 | Bar-Shalev ........... G06T 7/0044 250/363.04 |
| 2002/0143324 A1 | 10/2002 | Edwards |
| 2003/0088179 A1 | 5/2003 | Seeley et al. |
| 2003/0220555 A1 | 11/2003 | Heigl et al. |
| 2004/0143317 A1 | 7/2004 | Stinson et al. |
| 2005/0004454 A1 | 1/2005 | Mitschke et al. |
| 2005/0008210 A1 | 1/2005 | Evron et al. |
| 2005/0027193 A1 * | 2/2005 | Mitschke .............. G06T 7/0028 600/427 |
| 2005/0215874 A1 | 9/2005 | Wang et al. |
| 2006/0002630 A1 | 1/2006 | Fu et al. |
| 2006/0023840 A1 | 2/2006 | Boese |
| 2006/0079759 A1 | 4/2006 | Vaillant et al. |
| 2006/0116575 A1 | 6/2006 | Willis |
| 2007/0232898 A1 | 10/2007 | Huynh et al. |
| 2008/0262346 A1 | 10/2008 | Assis et al. |
| 2009/0080737 A1 | 3/2009 | Battle et al. |
| 2009/0123042 A1 * | 5/2009 | Gagnon ................ G06T 3/4061 382/128 |
| 2009/0216112 A1 | 8/2009 | Assis et al. |
| 2010/0239144 A1 * | 9/2010 | Fichtinger ............. A61B 5/418 382/131 |
| 2011/0033094 A1 | 2/2011 | Zarkh et al. |
| 2011/0112398 A1 | 5/2011 | Zarkh et al. |
| 2013/0116739 A1 | 5/2013 | Brada et al. |
| 2013/0259341 A1 | 10/2013 | Mountney et al. |
| 2013/0279780 A1 | 10/2013 | Grbic et al. |

* cited by examiner

FLUOROSCOPIC POSE ESTIMATION

CROSS-REFERENCE TO RELATED APPLICATIONS

This application claims the benefit of, and priority to, U.S. Provisional Patent Application No. 62/020,250, filed on Jul. 2, 2014, the entire contents of which are incorporated herein by reference.

BACKGROUND

1. Technical Field

The present disclosure relates to a system, apparatus, and method of navigation and position confirmation for surgical procedures. More particularly, the present disclosure relates to a system and method of finding fluoroscope projection variables (angles, focal point, zoom, etc.) relative to a CT in order to extract relevant data from the CT and overlay it on a fluoroscopic image.

2. Discussion of Related Art

Visualization techniques related to visualizing a patient's lungs have been developed so as to help clinicians perform diagnoses and/or surgeries on the patient's lungs. Visualization is especially important for identifying a location of a diseased region. Further, when treating the diseased region, additional emphasis is given to identification of the particular location of the diseased region so that a surgical operation is performed at the correct location.

For example in the lungs, endobronchial navigation systems have been developed that use CT image data to create a navigation plan to facilitate advancing a navigation catheter (or other suitable device) through a bronchoscope and a branch of the bronchus of a patient to the area of interest. Endobronchial navigation may be employed both in the diagnostic (i.e., biopsy) phase and the treatment phases. Electromagnetic tracking may be utilized in conjunction with the CT data to facilitate guiding the navigation catheter through the branch of the bronchus to the area of interest. In certain instances, the navigation catheter may be positioned within one of the airways of the branched luminal networks adjacent to or within the area of interest to provide access for one or more medical instruments. However, the CT data is not used in real time due to the rendering times and the radiation hazard to the users in the vicinity.

Once the navigation catheter is in position, fluoroscopy may be used to visualize medical instruments including biopsy tools, such as, for example, brushes, needles and forceps, as well as treatment tools such as an ablation catheter, as they are passed through the navigation catheter and into the lung and to the area of interest in real time. Conventional fluoroscopy is widely used during medical procedures as a visualization imaging tool for guiding medical instruments inside the human body. Although medical instruments like catheters, biopsy tools, etc., are clearly visible on a fluoroscopic picture, organic features such as soft tissue, blood vessels, suspicious tumor lesions etc., are either somewhat or completely transparent and thus hard to identify with conventional fluoroscopy. Moreover, fluoroscopic images render flat 2D images on which it can be somewhat challenging to assess three-dimensional position of the medical instrument. As such, the clinician is not provided all the information that could be desired to visualize the placement of the medical device within the patient's body relative to the area of interest.

Pose estimation methods are known, but such methods have limitations. For instance, there may be an eventual absence of solution due to non-convergence or the convergence leads to a wrong solution. There is no upper bound to the computing time. Some methods need to use 4 points and there exists geometric constraints on these points, in particular relatively to co-planarity. There may be a difficulty in debugging failures in an intuitive way. Further, some methods require a precise camera calibration.

SUMMARY

In an embodiment, the present disclosure discloses a method for registering three-dimensional (3D) CT image data with two-dimensional (2D) fluoroscopic image data using a plurality of markers. The method includes searching for a lateral angle and a cranial angle and moving a 3D mass center of a marker to a half segment between a source and a 2D mass center of the marker. The method also includes computing a roll angle, 3D translation coordinates. The roll angle and the 3D translation coordinates are computed for a predetermined number of times successively. The 3D CT image data are overlayed on the 2D fluoroscopic image data based on the lateral angle, the cranial angle, the roll angle, and the 3D translation coordinates.

In an aspect, searching for the lateral angle and the cranial angle includes trying sample values in a 2D grid, finding a minima based on the sample values, and trying sample values using a steepest descent method from the minima.

In another aspect, computing the roll angle includes computing a 2D vector joining the 2D mass center of the marker to 2D markers in the 2D fluoroscopic image data, computing a projected vector for projected 3D markers, and determining the roll angle which the angle between the 2D vector and the projected vector.

In an aspect, the method also includes determining a performance of a solution based on the lateral angle, the cranial angle, and the roll angle, wherein the performance is determined by computing a score of the solution.

In another aspect, the score is determined is a weighted sum of a mean distance between centers of projected 3D markers and 2D markers, the mean difference of length between the projected 3D markers and the 2D markers, and the mean angular difference between the projected 3D markers and the 2D markers.

In an aspect, computing the 3D translation coordinates includes obtaining a parallel translation and obtaining a perpendicular translation.

In another aspect, obtaining the parallel translation includes fitting a 3D mass center of projected 3D markers to the 2D mass center by moving the 3D mass center to the middle of the projection axis, and applying small translations parallel to a fluoro plane to the 3D mass center.

In yet another aspect, obtaining the perpendicular translation includes comparing mutual distances between 2D markers to mutual distances between projected 3D markers.

In another embodiment, the present disclosure discloses a method for registering three-dimensional (3D) CT image data with two-dimensional (2D) fluoroscopic image data using a plurality of markers. The method includes obtaining a plurality of fluoro markers and CT markers, searching for a lateral angle and a cranial angle, obtaining a parallel translation coordinate, and obtaining a perpendicular translation coordinate. A plurality of farther fluoro points and a farther projected point are determined and a plurality of possible matchings for a roll angle based on the plurality of farther fluoro points are also determined. The method also includes selecting a matching among the plurality of possible matchings, determining a number of seeds based on the selected matching, and calculating a precise 3D transformation for each seed among the number of seeds based on the lateral angle, the cranial angle, the parallel translation, and the perpendicular translation. Local minima based on the precise 3D transformation of each seed are determined and a local minimum is determined from the local minima using a steepest descent method. Rotation angles and translation coordinates corresponding to the local minimum are determined and the 3D CT image data is overlayed on the 2D fluoroscopic image data based on the determined rotation angles and translation coordinates.

In an aspect, searching for the lateral angle and the cranial angle includes trying sample values in a 2D grid, finding a minima based on the sample values, and trying sample values using a steepest descent method from the minima.

In another aspect, determining the plurality of possible matchings for the roll angle based on the plurality of farther fluoro points includes filtering out forbidden roll angles and calculating a score for each matching among the plurality of possible matchings.

In yet another aspect, selecting the matching among the plurality of possible matchings includes selecting the matching with the lowest score.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein.

DETAILED DESCRIPTION

Figure 1:
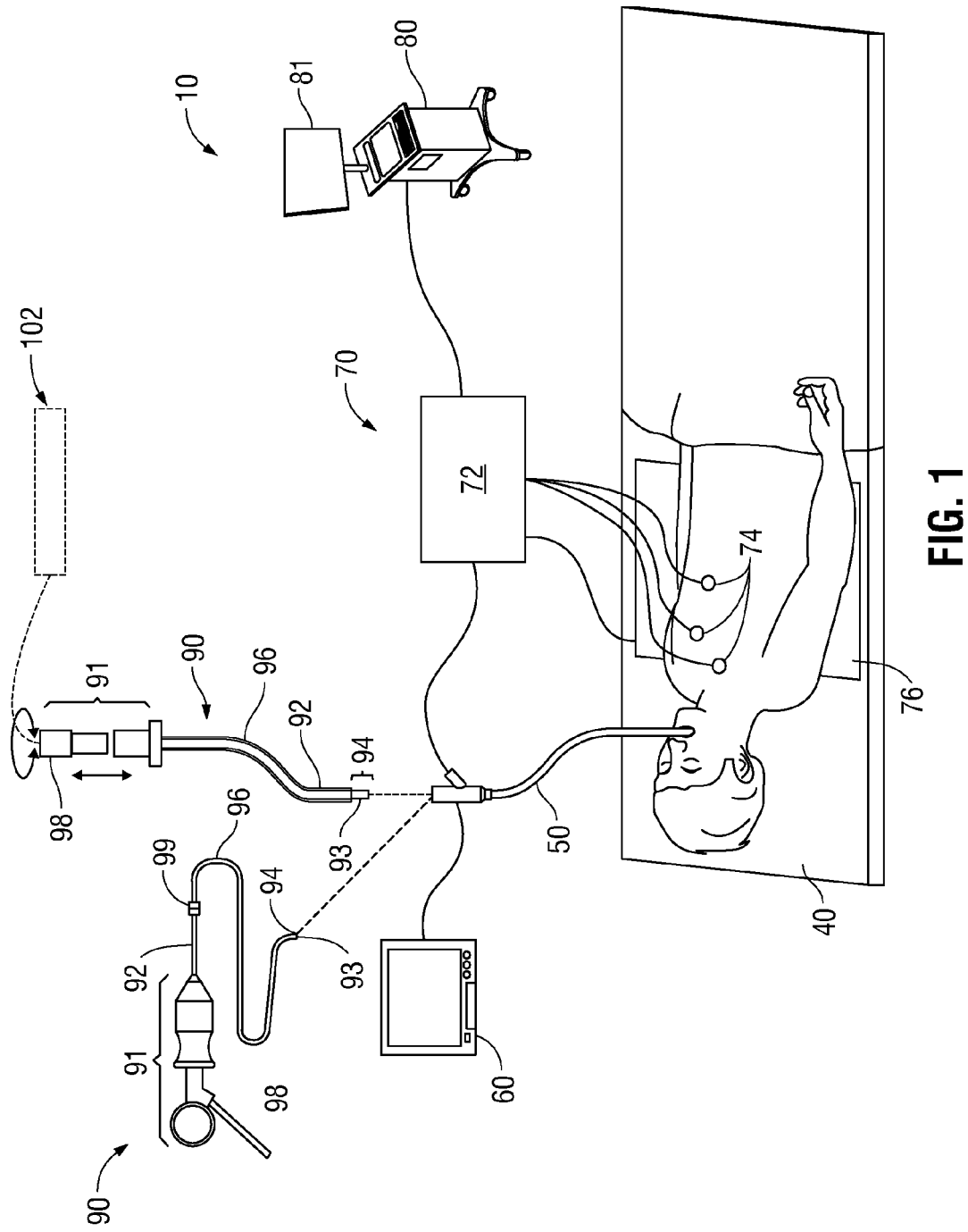
FIG. 1 is a perspective view of an electromagnetic navigation system in accordance with the present disclosure.

The present disclosure is related to devices, systems, and methods for finding the fluoroscopic projections relative to 3D CT image data in order to register or overlay portions of the 3D CT image onto a fluoroscopic 2D image. The 2D and 3D data are defined in different referentials and, as such, the rotation angles and translation coordinates between them needs to be computed precisely, in order to exploit both the 3D information from CT images and the precision and real-time character of the 2D fluoroscopic data. The calculations may be based on the coordinates of fiducial markers, measured both in 3D CT and 2D fluoroscopic data. Overlaying portions of the CT image onto a fluoroscopic 2D image may be useful to a user performing an ELECTROMAGNETIC NAVIGATION BRONCHOSCOPY® (ENB) procedure using an electromagnetic navigation (EMN) system.

An ENB procedure generally involves at least two phases: (1) planning a pathway to a target located within, or adjacent to, the patient's lungs; and (2) navigating a probe to the target along the planned pathway. These phases are generally referred to as (1) "planning" and (2) "navigation." The planning phase of an ENB procedure is more fully described in commonly-owned U.S. patent application Ser. Nos. 13/838,805; 13/838,997; and 13/839,224, all entitled "Pathway Planning System and Method," filed on Mar. 15, 2013, by Baker, the entire contents of which are hereby incorporated by reference. An example of the planning software can be found in commonly assigned U.S. Provision Patent Application No. 62/020,240 entitled "SYSTEM AND METHOD FOR NAVIGATING WITHIN THE LUNG" the entire contents of which are incorporated herein by reference.

Prior to the planning phase, the patient's lungs are imaged by, for example, a computed tomography (CT) scan, although additional applicable methods of imaging will be known to those skilled in the art. The image data assembled during the CT scan may then be stored in, for example, the Digital Imaging and Communications in Medicine (DICOM) format, although additional applicable formats will be known to those skilled in the art. The CT scan image data may then be loaded into a planning software application ("application") to be used during the planning phase of the ENB procedure.

Embodiments of the systems and methods are described with reference to the accompanying drawings. Like reference numerals may refer to similar or identical elements throughout the description of the figures. This description may use the phrases "in an embodiment," "in embodiments," "in some embodiments," or "in other embodiments," which may each refer to one or more of the same or different embodiments in accordance with the present disclosure.

With reference to FIG. 1, an electromagnetic navigation (EMN) system 10 is provided in accordance with the present disclosure. Among other tasks that may be performed using the EMN system 10 are planning a pathway to target tissue, navigating a positioning assembly to the target tissue, navigating a biopsy tool to the target tissue to obtain a tissue sample from the target tissue using the biopsy tool, and digitally marking the location where the tissue sample was obtained, and placing one or more echogenic markers at or around the target.

EMN system 10 generally includes an operating table 40 configured to support a patient; a bronchoscope 50 configured for insertion through the patient's mouth and/or nose into the patient's airways; monitoring equipment 60 coupled to bronchoscope 50 for displaying video images received from bronchoscope 50; a tracking system 70 including a tracking module 72, a plurality of reference sensors 74, and an electromagnetic field generator 76; a workstation 80 including software and/or hardware used to facilitate pathway planning, identification of target tissue, navigation to target tissue, and digitally marking the biopsy location FIG. 1 also depicts two types of catheter guide assemblies 90, 100. Both catheter guide assemblies 90, 100 are usable with the EMN system 10 and share a number of common components. Each catheter guide assembly 90, 100 includes a handle 91, which is connected to an extended working channel (EWC) 96. The EWC 96 is sized for placement into the working channel of a bronchoscope 50. In operation, a locatable guide (LG) 92, including an electromagnetic (EM) sensor 94, is inserted into the EWC 96 and locked into position such that the sensor 94 extends a desired distance beyond the distal tip 93 of the EWC 96. The location of the EM sensor 94, and thus the distal end of the EWC 96, within an electromagnetic field generated by the electromagnetic field generator 76 can be derived by the tracking module 72, and the workstation 80.

Figure 2:
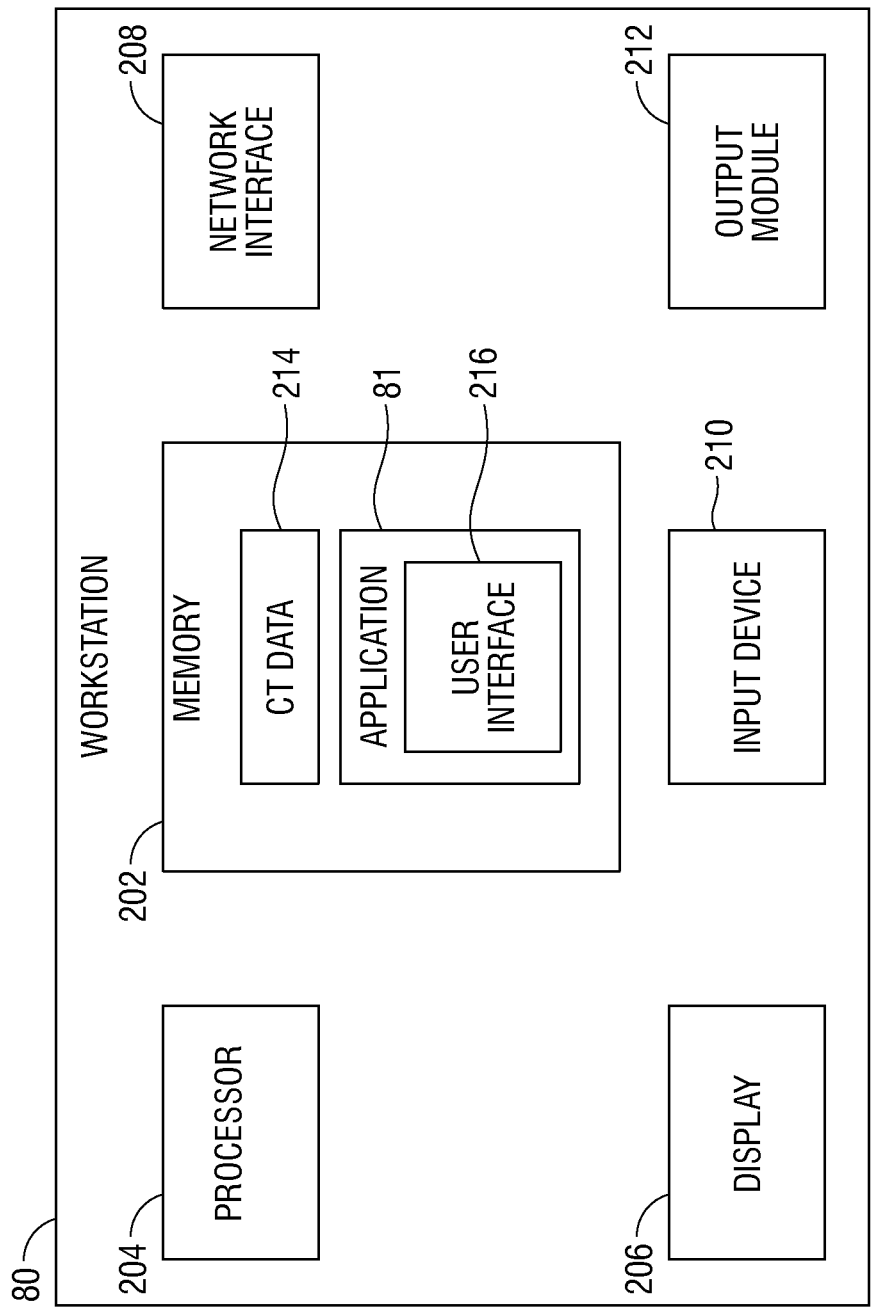
FIG. 2 is a schematic diagram of a workstation configured for use with the system of FIG. 1.

Turning now to FIG. 2, there is shown a system diagram of workstation 80. Workstation 80 may include memory 202, processor 204, display 206, network interface 208, input device 210, and/or output module 212.

Figure 3:
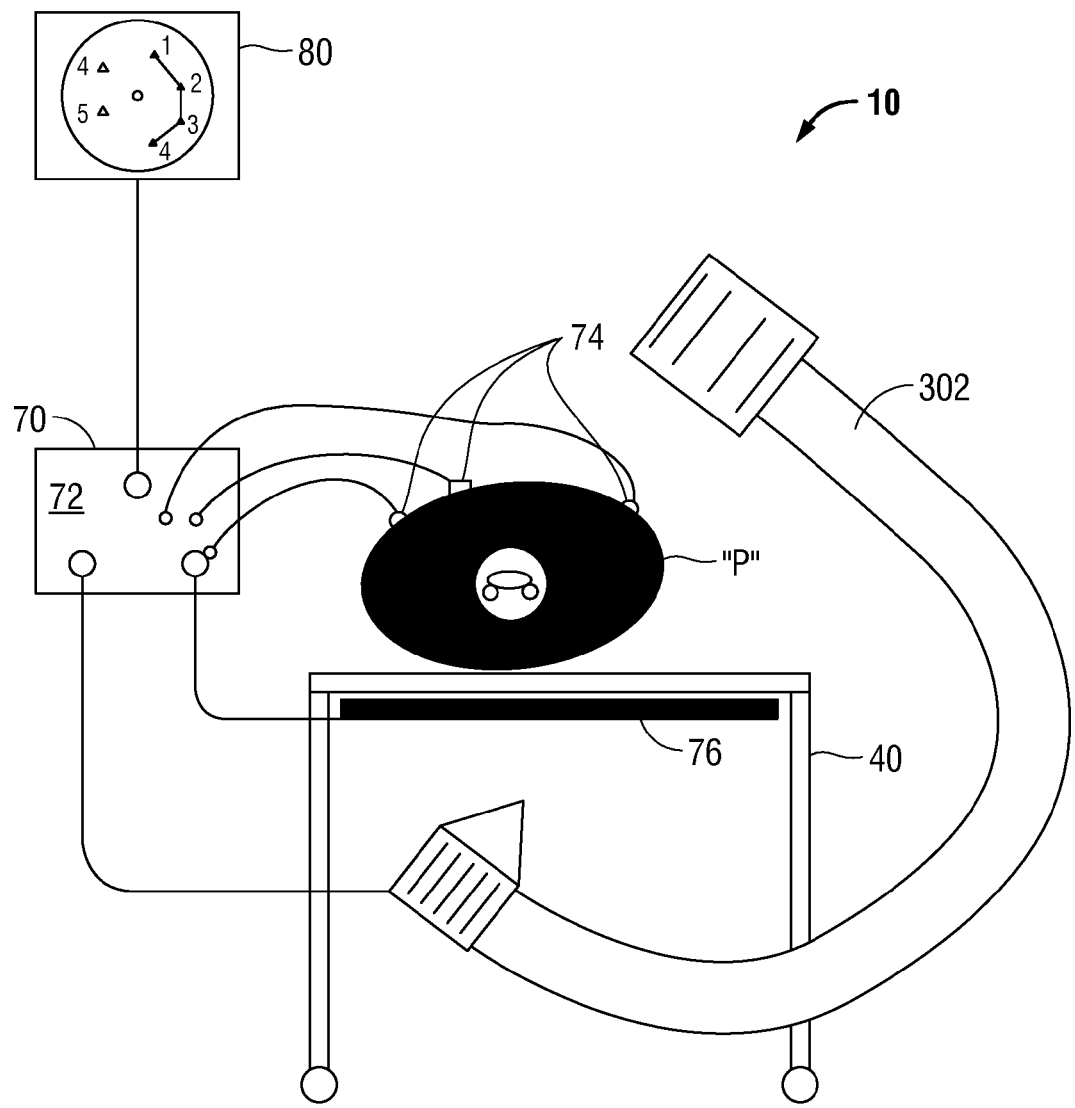
FIG. 3 is an end view of a fluoroscopic imaging C-arm incorporated in the EMN system of FIG. 1.

FIG. 3 depicts another view of the EMN system 10, including a fluoroscopic imaging device 302 capable of acquiring fluoroscopic or x-ray images or video of the patient "P." The images, series of images, or video captured may be stored within the imaging device 302 or transmitted to workstation 80 for storage, processing, and display. Additionally, the imaging device 302 may rotate about the patient "P" so that images may be acquired from different angles or perspectives relative to the patient "P." Imaging device 302 may include a single imaging device or more than one imaging device. In embodiments including multiple imaging devices, each imaging device may be a different type of imaging device or the same type. Further details regarding the imaging device 302 are described in U.S. Pat. No. 8,565,858, which is incorporated by reference in its entirety herein.

Figure 4:
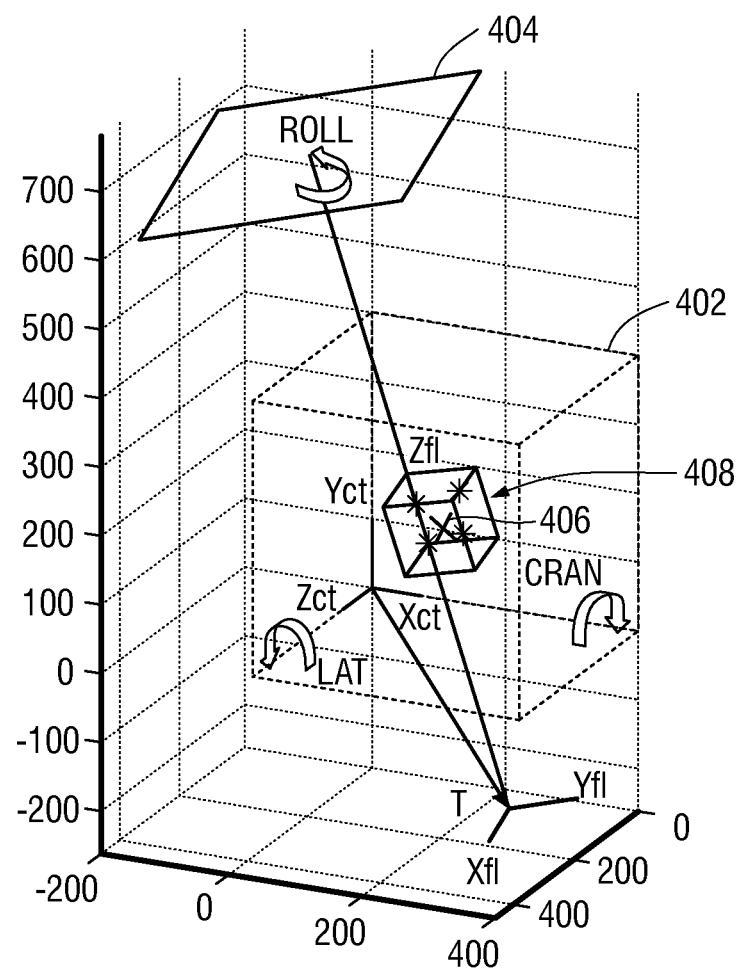
FIG. 4 is an illustration representing a geometry of the problem with registering 3D CT image data with the 2D fluoroscopic image data.

FIG. 4 illustrates a geometry of the problem with registering 3D CT image data with the 2D fluoroscopic image data when the coordinates of three (3) or more markers in the 3D CT image data and 2D fluoroscopic image data are known. FIG. 4 shows a CT referential volume 402, a fluoroscopic referential plane 404, markers 406, and a region of interest (ROI) 408 in the vicinity of a target. There are six (6) unknown variables that need to be solved in order to register the 3D CT image data of CT referential volume 402 with the 2D fluoroscopic image data of fluoroscopic referential plane 404, i.e., three (3) rotation angles (lateral, cranial, and roll) and three (3) translation coordinates (Tx, Ty, and Tz).

Figure 5:
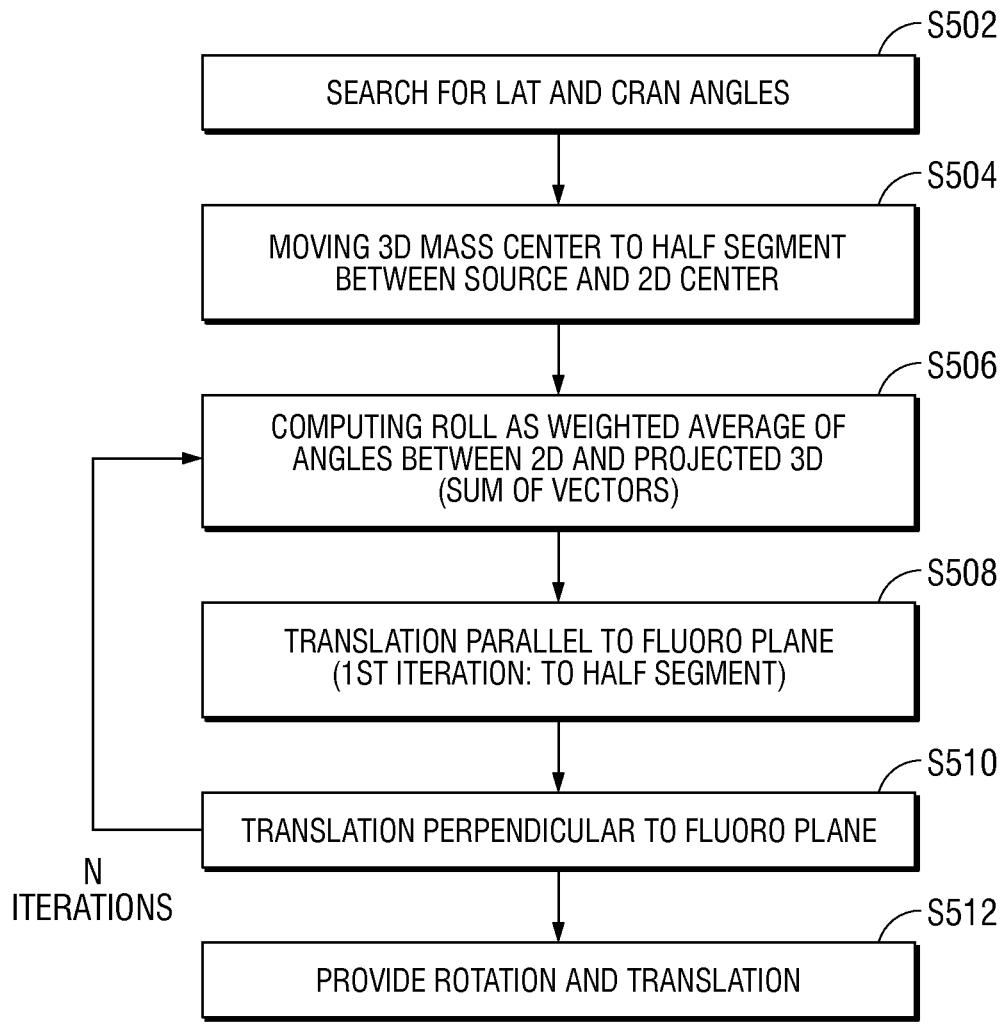
FIG. 5 is a flow chart of a method for computing a succession of transformations in accordance with the present disclosure.
Figure 6:
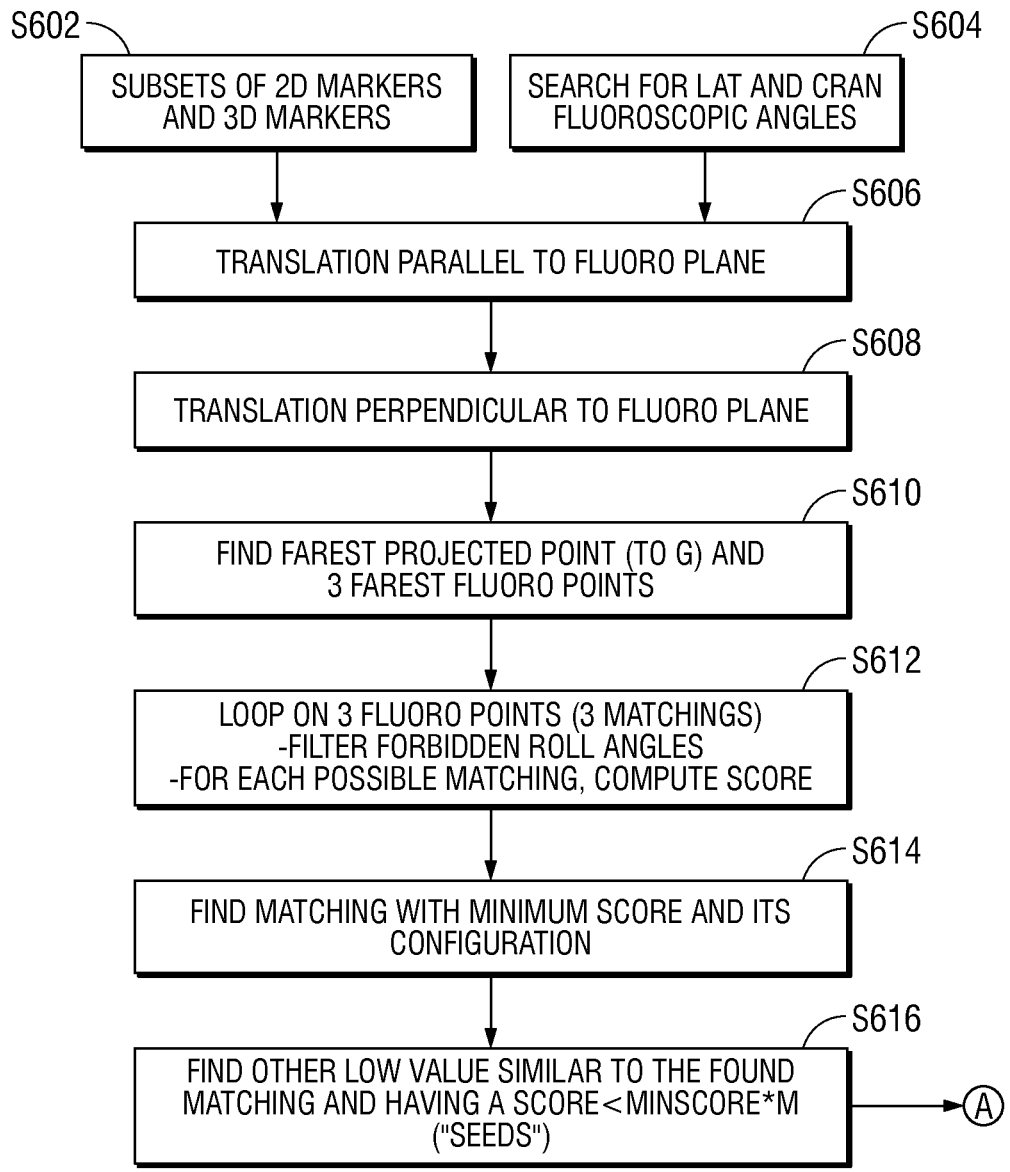
FIG. 6 is flow chart of a method for performing correspondence between the 3D CT image data and the 2D fluoroscopic image data in accordance with the present disclosure.
Figure 7:
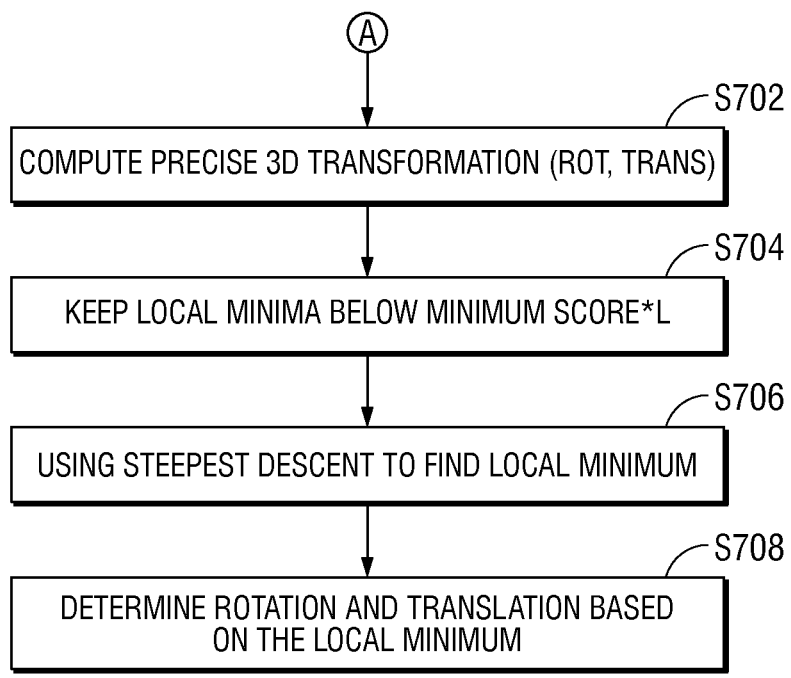
FIG. 7 is a flow chart depicting registration of the 3D CT image data and the 2D fluoroscopic image data in accordance with the present disclosure.

FIGS. 5-7 provide methods of using the components of system 10 in conjunction with CT imaging to solve the rotation angles and translation coordinates in order to register the 3D CT image data with the 2D fluoroscopic image data. Such methods may be used in conjunction with enhanced navigation techniques as described in U.S. Provisional Application No. 62/073,287 entitled "Computed Tomography Enhanced Fluoroscopic System, Device, And Method Of Utilizing The Same," filed on Oct. 31, 2014, by Averbuch et al., the entire contents of which are hereby incorporated by reference.

FIG. 5 depicts a flowchart of the steps involved in computing a succession of elementary transformations to determine the rotation angles and the translation coordinates. In the method, the 3D rotation angles and 3D translation coordinates are decomposed in a succession of transformations which can be easily determined from the comparison of the 2D marker coordinates to the projections of the 3D marker coordinates. The rotation angles lateral and cranial cannot be estimated directly. As such, a search is performed in step s502 to minimize any error when fitting for markings. In the search, sample values in a 2D grid are tried in steps of 15 degrees. When a minimum is determined in this grid, values are tried in a grid of better resolution in increments of 1 degree until a minimum is reached again—propagating from the rough minimum to the lowest error using 1 degree steps at each iteration The values that are minimized are the error of fittings of the projected 3D CT markers to the segmented 2D markers in the fluoro image—both in the extensive search in the steps of 15 degrees and in the propagation of 1 degree steps. The minimum is found when all 8 neighbors around a point in the grid have a higher error. The output is the location of the minimum with a 1 degree precision (lateral angle and cranial angle) and the corresponding error. The precision can also be defined at less than 1 degree if needed. Only the gradient direction is used to find the next point of lowest error.

In step s504, the 3D mass center of the CT markers is moved to the middle between the fluoro source and the 2D mass center of the fluoro markers. The mass center, both in 2D and 3D, is the mass center of all the markers together. By moving the 3D mass center to middle between the fluoro source and the 2D mass center of the fluoro markers, a first rough fitting of the 3D CT markers to the 2D fluoro markers can be found for the lateral angle and the cranial angle. In step s506, the roll angle is determined by: computing the 2D vectors joining the 2D mass center of the fluoro markers to the fluoro markers in the fluoroscopic image; computing the corresponding 2D vectors joining the projected 3D markers to their mass center; and determining the angles between the 2D vectors and the corresponding projected vectors.

When looking for the fluoroscope angles lateral, cranial, and roll, the performance of the solutions associated to each couple of angles has to be compared. A score characterizing the error of fitting of projected 3D markers to 2D fluoroscopic markers is calculated, as the weighted sum of three (3) terms: the mean distance between the projected 3D markers centers and the 2D markers centers; the mean difference of length between projected 3D markers and 2D markers; and the mean angular difference between projected 3D markers and 2D markers. The score is used as scalar criterion of best fitting and the registration solution should minimize the score. The score is further used as criterion of failure/success with a simple threshold where the threshold is an upper bound of the acceptable score.

In order to insure homogeneity, the three (3) terms are measured in millimeters. As such, the angular terms are multiplied by the length of the 2D marker. Because the angular terms are expressed in radians which have no physical dimension homogeneity is insured.

The 3D translation is decomposed in two terms, parallel and perpendicular to the fluoroscopic plane. In step s508, the translation in a direction parallel to the fluoro plane is obtained by fitting the mass center of the projected 3D markers to the 2D mass center by moving the 3D mass center to the middle of the projection axis and then by small translations parallel to the fluoro plane to the 2D mass center. The projection axis is the line joining the source of the fluoroscope to the mass center of the fluoro markers. The projection axis is roughly perpendicular to the fluoro plane. In step s510, the translation in a direction perpendicular to the fluoro plane is obtained by comparing the mutual distances between 2D markers to the mutual distances between the projections of 3D markers. This comparison provides scaling which leads to the sign and amplitude of translation.

Steps s506 to s510 are computed N times successively, where N is greater than two (2). In experiments, four (4) iterations have been shown as the number of iterations needed to reach convergence. Once convergence is reached a user may rely on the estimation of the target location. In step s512, the rotation angles and translation coordinates are provided to the workstation to overlay portions of the CT image onto the fluoroscopic image. Particularly, the rotation and translation angles are used to compute the location of the target on the fluoro image—and of other anatomic structures such as the airways, according to the need of the physician. The 2D location is computed by applying the rotation and translation angles to the 3D CT data selected (multiplication by the 4×4 matrix in homogeneous coordinates), and then projecting the new 3D coordinates onto the fluoro plane with the equation xF1=f*x/z+xcenter.

FIG. 5 describes the computation of the roll and translation given: (i) the fluoro angles lateral and cranial; and (ii) a matching between 2D fluoro markers and the 3D Ct markers. FIG. 6 implements the computation for registration when the matching is not known. As will be described below, steps s606, s608, s610 are steps which do not need knowledge of a matching and are common to all matchings. In steps s612, s614 and s616, all matchings are compared to select the one giving the best score of fitting. Once the correct matching has been found, several solutions for the fluoro angle (with rough precision of 15 degrees) may still exist and the precise registration at 1 degree precision needs to be computed. The final solution is the one giving the lowest score of fitting error using the steps of FIG. 7.

For the sake of speed, all computations are computed roughly in 2D: rotation, translation, and scaling. In the method, the subset of 2D markers and 3D markers are provided in step s602 and the lateral and cranial angles are searched in step s604. Step s604 is similar to step s502 described above. In step s606, the parallel translation coordinate is obtained by fitting the mass centers of the markers. The fitting is performed in the 2D fluoro plane. The perpendicular translation coordinate is obtained in step s608 from distances between each marker and all other markers in the 2D fluoro plane. The distances between markers are a measure of the scale. Thus, the set of distances between the fluoro markers are compared on one hand, and on the other hand, the corresponding set of distances for projected markers are compared. This transformation (2D translation and scaling) is common to all possible matchings and is independent from the matching.

In steps s610 to s616, the 2D rotation is computed by matching the most peripheral points relative to the mass center (projected points versus fluoroscopic points). In step s610, the projected 3D marker (in 2D) that is farest to the mass center of the projected markers and three (3) candidates in the fluoro data are selected. The three (3) candidates considered in the fluoro data are the flouro markers that are the farest to the mass center of the 2D fluoro markers. In step s612, the three (3) farther fluoro points are used to determine three (3) possible matchings for the roll angle. In other words, the three (3) candidate fluoro markers are matched to the selected (farest) projected 3D marker. This defines 3 roll angles, one roll angle for each matching. Only one roll angle is true, and possibly some roll angles may be eliminated. In step s612, the forbidden roll angles, which are angles outside of +/−30°, are filtered out and a score is calculated for each of the three (3) possible matchings as described above with regard to FIG. 4. Once the scores are calculated, the matching with the minimum score is determined in step s614. In step s616, seeds, i.e., different fluoro angles (lateral and cranial) for the same matching, are determined by finding other values of the lateral and cranial angles that have similar matching to the minimum score and have a score that is less than the minimum score of the determined matching multiplied by a constant "M", where M is greater than one (e.g. M=4). In FIG. 6, there is a double loop: on the markers and on the fluoro angles. Thus, even if the correct matching has been found, a user still has the choice of other fluoro angles with different solutions.

The approximated translations and rotations are computed along a rough 2D grid of fluoroscopic angles. The method of FIG. 6 is performed before registration and its output is the matching between markers and good initial values of fluoroscopic angles. The output is then used as input for a registration method as shown in FIG. 7.

As shown in FIG. 7, a precise 3D transformation for each seed is calculated in step s702 based on the approximated translations and rotations from the method of FIG. 5. In steps s704, local minima are determined by comparing the score of each seed to the minimum score multiplied by a constant "L" (e.g., L=1.5). A local minimum is a fluoro angle (lateral, cranial) for which the score of fitting error is smaller than for its 8 neighbors (at a distance 15 degrees). The score of fitting error is computed—for the candidate and for its neighbors—by using the registration method of FIG. 5. The local minima are determined in a rough 2D grid of fluoroscopic angles. In step s706, steepest descent method is used to find the local minimum. Specifically, for each of the minima found (defined in a grid of step 15 degrees), we improve the precision by propagating to the next lower value with a precision of 1 degree. The neighbors at distance 1 degree are looked at and the neighbor having the minimum score is selected. This process is iterated until the current point has a score smaller to all its neighbors In step s708, the rotation angles and translation coordinates are determined based on the determined local minimum and computed using the method shown in FIG. 5. The rotation angles and translation coordinates are provided to the workstation to overlay portions of the CT image onto the fluoroscopic image.

Figure 8:
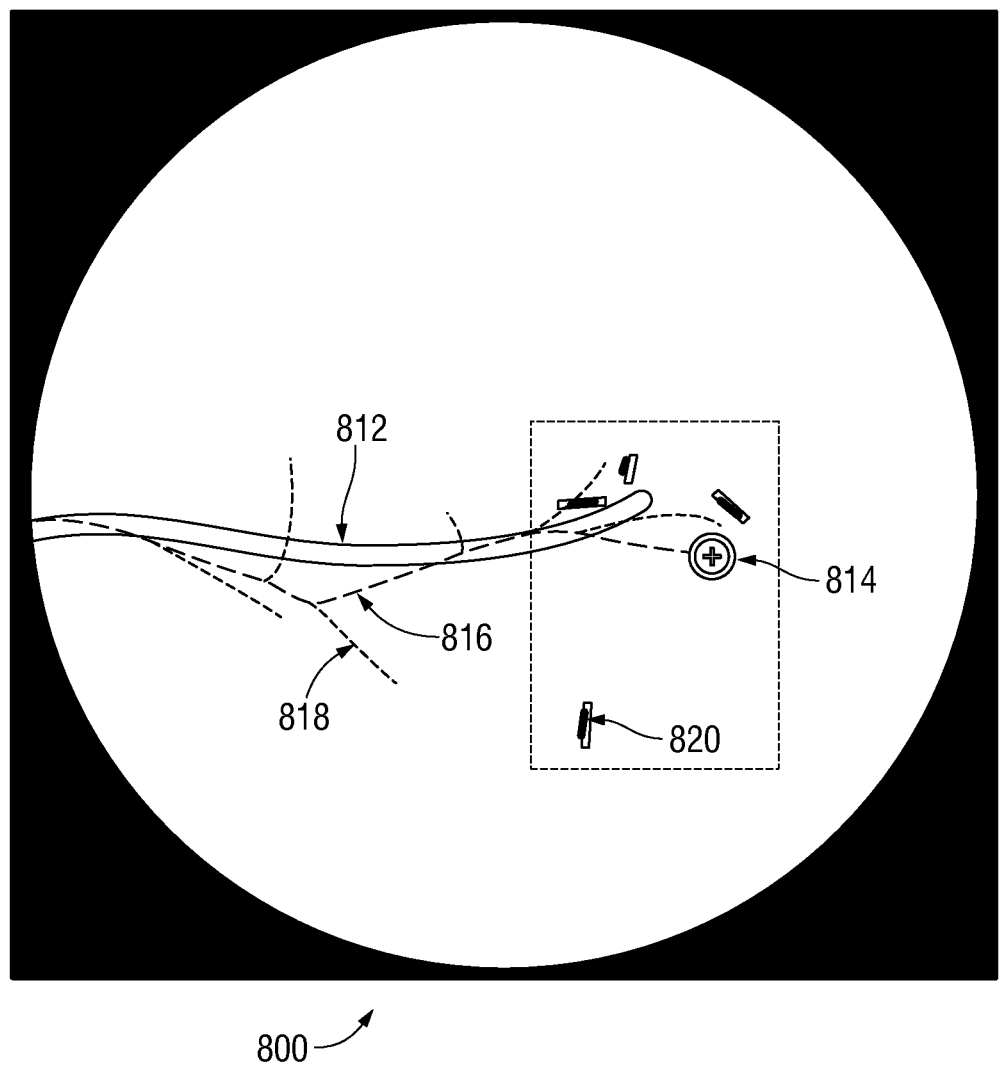
FIG. 8 is an illustration of an example fluoroscopic image/video captured by a C-arm showing markers and an extended working channel of a catheter assembly positioned within a target region of a patient in accordance with the present disclosure.

FIG. 8 depicts the image outcome of the embodiments of the present disclosure. In FIG. 8, a composite fluoroscopic image 800 is displayed. The composite fluoroscopic image 800 may be presented on a display as an additional view of EMN system 10 (FIG. 1) used for navigation. Alternatively, the image may be presented on a fluoroscopic image viewer separate from the EMN system 10. The field of view of the fluoroscopic image 800 includes a distal portion of the EWC 96 that has been maneuvered pursuant to a pathway plan. The fluoroscopic image 800 is also overlaid with a variety of data originally developed and derived from navigation software. This additional data overlaid on the fluoroscopic image 800 includes a target 814, a pathway plan 816, luminal pathways of the area being imaged 818, and markers 820. With this enhanced fluoroscopic image 800, a clinician is allowed to visualize in real time the final placement of the EWC 96 in relation to the pathway plan 816, the target 814 and the markers 820 to ensure accurate final placement, as well as discern if there is any unintended movement of the EWC 96 as a result of tool exchanges into and out of the EWC 96.

In accordance with the present disclosure a solution may be determined in a constant and short time (typically 0.2 s with common computer material and in Matlab®), using a constant number of iterations without convergence problems. Although a minimum of three (3) markers are needed, any number greater than three (3) is acceptable and improves the precision of the system. The search process also provides information on the existence of multiple solutions and on the robustness of the results depending upon the 3D configuration of markers, such as co-linearity, symmetry, parallelism, etc. The methods described herein rely on simple geometric concepts which allow for easy understanding and failure analysis. The methods also permit fast correspondence. The methods are adaptable to other image modalities and to other domains of pose estimation between 3D and 2D. There is no need for camera calibration because the projection parameters have practically no influence on the computations, except for the center of the image where the projection line is perpendicular to the fluoro plane which can be computed easily from the image mask. Any type of projection 3D to 2D may be used (projective, orthogonal . . . ) with the methods described herein.

Referring back to FIG. 1, catheter guide assemblies 90, 100 have different operating mechanisms, but each contain a handle 91 that can be manipulated by rotation and compression to steer the distal tip 93 of the LG 92, extended working channel 96. Catheter guide assemblies 90 are currently marketed and sold by Covidien LP under the name SUPERDIMENSION® Procedure Kits, similarly catheter guide assemblies 100 are currently sold by Covidien LP under the name EDGE™ Procedure Kits, both kits include a handle 91, extended working channel 96, and locatable guide 92. For a more detailed description of the catheter guide assemblies 90, 100 reference is made to commonly-owned U.S. patent application Ser. No. 13/836,203 filed on Mar. 15, 2013 by Ladtkow et al., the entire contents of which are hereby incorporated by reference.

As illustrated in FIG. 1, the patient is shown lying on operating table 40 with bronchoscope 50 inserted through the patient's mouth and into the patient's airways. Bronchoscope 50 includes a source of illumination and a video imaging system (not explicitly shown) and is coupled to monitoring equipment 60, e.g., a video display, for displaying the video images received from the video imaging system of bronchoscope 50.

Catheter guide assemblies 90, 100 including LG 92 and EWC 96 are configured for insertion through a working channel of bronchoscope 50 into the patient's airways (although the catheter guide assemblies 90, 100 may alternatively be used without bronchoscope 50). The LG 92 and EWC 96 are selectively lockable relative to one another via a locking mechanism 99. A six degrees-of-freedom electromagnetic tracking system 70, e.g., similar to those disclosed in U.S. Pat. No. 6,188,355 and published PCT Application Nos. WO 00/10456 and WO 01/67035, the entire contents of each of which is incorporated herein by reference, or any other suitable positioning measuring system, is utilized for performing navigation, although other configurations are also contemplated. Tracking system 70 is configured for use with catheter guide assemblies 90, 100 to track the position of the EM sensor 94 as it moves in conjunction with the EWC 96 through the airways of the patient, as detailed below.

As shown in FIG. 1, electromagnetic field generator 76 is positioned beneath the patient. Electromagnetic field generator 76 and the plurality of reference sensors 74 are interconnected with tracking module 72, which derives the location of each reference sensor 74 in six degrees of freedom. One or more of reference sensors 74 are attached to the chest of the patient. The six degrees of freedom coordinates of reference sensors 74 are sent to workstation 80, which includes application 81 where sensors 74 are used to calculate a patient coordinate frame of reference.

Also shown in FIG. 1 is a catheter biopsy tool 102 that is insertable into the catheter guide assemblies 90,100 following navigation to a target and removal of the LG 92. The biopsy tool 102 is used to collect one or more tissue sample from the target tissue. As detailed below, biopsy tool 102 is further configured for use in conjunction with tracking system 70 to facilitate navigation of biopsy tool 102 to the target tissue, tracking of a location of biopsy tool 102 as it is manipulated relative to the target tissue to obtain the tissue sample, and/or marking the location where the tissue sample was obtained.

Although navigation is detailed above with respect to EM sensor 94 being included in the LG 92 it is also envisioned that EM sensor 94 may be embedded or incorporated within biopsy tool 102 where biopsy tool 102 may alternatively be utilized for navigation without need of the LG or the necessary tool exchanges that use of the LG requires. A variety of useable biopsy tools are described in U.S. Provisional Patent Application Nos. 61/906,732 and 61/906,762 both entitled DEVICES, SYSTEMS, AND METHODS FOR NAVIGATING A BIOPSY TOOL TO A TARGET LOCATION AND OBTAINING A TISSUE SAMPLE USING THE SAME, filed Nov. 20, 2013 and U.S. Provisional Patent Application No. 61/955,407 having the same title and filed Mar. 14, 2014, the entire contents of each of which are incorporated herein by reference and useable with the EMN system 10 as described herein.

During procedure planning, workstation 80 utilizes computed tomographic (CT) image data for generating and viewing a three-dimensional model ("3D model") of the patient's airways, enables the identification of target tissue on the 3D model (automatically, semi-automatically or manually), and allows for the selection of a pathway through the patient's airways to the target tissue. More specifically, the CT scans are processed and assembled into a 3D volume, which is then utilized to generate the 3D model of the patient's airways. The 3D model may be presented on a display monitor 81 associated with workstation 80, or in any other suitable fashion. Using workstation 80, various slices of the 3D volume and views of the 3D model may be presented and/or may be manipulated by a clinician to facilitate identification of a target and selection of a suitable pathway through the patient's airways to access the target. The 3D model may also show marks of the locations where previous biopsies were performed, including the dates, times, and other identifying information regarding the tissue samples obtained. These marks may also be selected as the target to which a pathway can be planned. Once selected, the pathway is saved for use during the navigation procedure.

During navigation, EM sensor 94, in conjunction with tracking system 70, enables tracking of EM sensor 94 and/or biopsy tool 102 as EM sensor 94 or biopsy tool 102 is advanced through the patient's airways.

Registration, as detailed above, is generally performed to coordinate locations of the three-dimensional model and two-dimensional images from the planning phase with the patient's "P's" airways as observed through the bronchoscope 50, and allow for the navigation phase to be undertaken with precise knowledge of the location of the sensor 94, even in portions of the airway where the bronchoscope 50 cannot reach. Further details of such a registration technique and their implementation in luminal navigation can be determined in U.S. Patent Application Pub. No. 2011/0085720, the entire contents of which, is incorporated herein by reference, although other suitable techniques are also contemplated.

Registration of the patient "P's" location on the transmitter mat 76 is performed by moving LG 92 through the airways of the patient "P." More specifically, data pertaining to locations of sensor element 94, while locatable guide 92 is moving through the airways, is recorded using transmitter mat 76, reference sensors 74, and tracking module 72. A shape resulting from this location data is compared to an interior geometry of passages of the three-dimensional model generated in the planning phase, and a location correlation between the shape and the three-dimensional model based on the comparison is determined, e.g., utilizing the software on workstation 80. In addition, the software identifies non-tissue space (e.g., air filled cavities) in the three-dimensional model. The software aligns, or registers, an image representing a location of sensor 94 with a the three-dimensional model and two-dimensional images generated from the three-dimension model, which are based on the recorded location data and an assumption that locatable guide 92 remains located in non-tissue space in the patient's "P's" airways. Alternatively, a manual registration technique may be employed by navigating the bronchoscope 50 with the sensor 94 to pre-specified locations in the lungs of the patient "P", and manually correlating the images from the bronchoscope to the model data of the 3D model.

Following registration of the patient "P" to the image data and pathway plan, a user interface is displayed in the navigation software which sets for the pathway that the clinician is to follow to reach the target. One such navigation software is the ILOGIC® navigation suite currently sold by Covidien LP.

Referring back to FIG. 2, memory 202 includes any non-transitory computer-readable storage media for storing data and/or software that is executable by processor 204 and which controls the operation of workstation 80. In an embodiment, memory 202 may include one or more solid-state storage devices such as flash memory chips. Alternatively or in addition to the one or more solid-state storage devices, memory 202 may include one or more mass storage devices connected to the processor 204 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 204. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by workstation 80.

Memory 202 may store application 81 and/or CT data 214. Application 81 may, when executed by processor 204, cause display 206 to present user interface 216. Network interface 208 may be configured to connect to a network such as a local area network (LAN) consisting of a wired network and/or a wireless network, a wide area network (WAN), a wireless mobile network, a Bluetooth network, and/or the internet. Input device 210 may be any device by means of which a user may interact with workstation 80, such as, for example, a mouse, keyboard, foot pedal, touch screen, and/or voice interface. Output module 212 may include any connectivity port or bus, such as, for example, parallel ports, serial ports, universal serial busses (USB), or any other similar connectivity port known to those skilled in the art.

Any of the herein described methods, programs, algorithms or codes may be converted to, or expressed in, a programming language or computer program. A "Programming Language" and "Computer Program" is any language used to specify instructions to a computer, and includes (but is not limited to) these languages and their derivatives: Assembler, Basic, Batch files, BCPL, C, C+, C++, Delphi, Fortran, Java, JavaScript, Machine code, operating system command languages, Pascal, Perl, PL1, scripting languages, Visual Basic, metalanguages which themselves specify programs, and all first, second, third, fourth, and fifth generation computer languages. Also included are database and other data schemas, and any other metalanguages. For the purposes of this definition, no distinction is made between languages which are interpreted, compiled, or use both compiled and interpreted approaches. For the purposes of this definition, no distinction is made between compiled and source versions of a program. Thus, reference to a program, where the programming language could exist in more than one state (such as source, compiled, object, or linked) is a reference to any and all such states. The definition also encompasses the actual instructions and the intent of those instructions.

Further aspects of the planning phase as well as the navigation phase of an ENB procedure are more fully described in commonly-owned U.S. Provisional Patent Application Ser. No. 62/020,220 entitled "Real-Time Automatic Registration Feedback," filed on Jul. 2, 2014, by Brown et al.; U.S. Provisional Patent Application Ser. No. 62/020,177 entitled "Methods for Marking Biopsy Location," filed on Jul. 2, 2014, by Brown; U.S. Provisional Patent Application Ser. No. 62/020,238 entitled "Intelligent Display," filed on Jul. 2, 2014, by Kehat et al.; U.S. Provisional Patent Application Ser. No. 62/020,242 entitled "Unified Coordinate System For Multiple Ct Scans Of Patient Lungs," filed on Jul. 2, 2014, by Greenburg; U.S. Provisional Patent Application Ser. No. 62/020,245 entitled "Alignment CT," filed on Jul. 2, 2014, by Klein et al.; U.S. Provisional Patent Application Ser. No. 62/020,261 entitled "System and Method for Segmentation of Lung," filed on Jul. 2, 2014, by Markov et al.; U.S. Provisional Patent Application Ser. No. 62/020,253 entitled "Trachea Marking," filed on Jul. 2, 2014, by Lachmanovich et al.; U.S. Provisional Patent Application Ser. No. 62/020,257 entitled "Automatic Detection Of Human Lung Trachea," filed on Jul. 2, 2014, by Markov et al.; U.S. Provisional Patent Application Ser. No. 62/020,261 entitled "Lung And Pleura Segmentation," filed on Jul. 2, 2014, by Markov et al.; U.S. Provisional Patent Application Ser. No. 62/020,258 entitled "Cone View—A Method Of Providing Distance And Orientation Feedback While Navigating In 3d," filed on Jul. 2, 2014, by Lachmanovich et al.; and U.S. Provisional Patent Application Ser. No. 62/020,262 entitled "Dynamic 3D Lung Map View for Tool Navigation Inside the Lung," filed on Jul. 2, 2014, by Weingarten et al., the entire contents of all of which are hereby incorporated by reference.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure.

What is claimed is:

1. A method for registering three-dimensional (3D) CT image data with two-dimensional (2D) fluoroscopic image data using a plurality of markers, the method comprising: searching for a lateral angle and a cranial angle by sampling values in a 2D grid and finding minima based on the sample values; moving a 3D mass center of a marker to a half segment between a source and a 2D mass center of the marker; computing a roll angle; computing 3D translation coordinates; wherein computing the 3D translation coordinates includes: obtaining a parallel translation; obtaining a perpendicular translation; computing the roll angle and the 3D translation coordinates for a predetermined number of times successively; and overlaying, the 3D CT image data on the 2D fluoroscopic image data based on the lateral angle, the cranial angle, the roll angle, and the 3D translation coordinates.

2. The method of claim 1, wherein searching for the lateral angle and the cranial angle includes: sampling values using a steepest descent method from the minima.

3. The method of claim 1, wherein computing the roll angle includes:
  computing a 2D vector joining the 2D mass center of the marker to 2D markers in the 2D fluoroscopic image data;
  computing a projected vector for projected 3D markers; and
  determining the roll angle which the angle between the 2D vector and the projected vector.

4. The method of claim 1, further comprising determining a performance of a solution based on the lateral angle, the cranial angle, and the roll angle, wherein the performance is determined by computing a score of the solution.

5. A method for registering three-dimensional (3D) CT image data with two-dimensional (2D) fluoroscopic image data using a plurality of markers, the method comprising:
  searching for a lateral angle and a cranial angle;
  moving a 3D mass center of a marker to a half segment between a source and a 2D mass center of the marker;
  computing a roll angle;
  computing 3D translation coordinates;
  computing the roll angle and the 3D translation coordinates for a predetermined number of times successively;
  determining a performance of a solution based on the lateral angle, the cranial angle, and the roll angle, wherein the performance is determined by computing a score of the solution, wherein the score is a weighted sum of a mean distance between centers of projected 3D markers and 2D markers, the mean difference of length between the projected 3D markers and the 2D markers, and the mean angular difference between the projected 3D markers and the 2D markers; and
  overlaying the 3D CT image data on the 2D fluoroscopic image data based on the lateral angle, the cranial angle, the roll angle, and the 3D translation coordinates.

6. The method of claim 1, wherein obtaining the parallel translation includes:
  fitting a 3D mass center of projected 3D markers to the 2D mass center by moving the 3D mass center to the middle of the projection axis; and
  applying small translations parallel to a fluoro plane to the 3D mass center.

7. The method of claim 1, wherein obtaining the perpendicular translation includes comparing mutual distances between 2D markers to mutual distances between projected 3D markers.

8. A method for registering three-dimensional (3D) CT image data with two-dimensional (2D) fluoroscopic image data using a plurality of markers, the method comprising: obtaining a plurality of fluoro markers and CT markers; searching for a lateral angle and a cranial angle by sampling values in a 2D grid and finding minima based on the sample values; moving a 3D mass center of the CT markers to a half segment between a source and a 2D mass center of the fluoro markers; obtaining a parallel translation coordinate; obtaining a perpendicular translation coordinate; determining a plurality of farther fluoro points and a farther projected point; determining a plurality of possible matchings for a roll angle based on the plurality of farther fluoro points; selecting a matching among the plurality of possible matchings; determining a number of seeds based on the selected matching; calculating a precise 3D transformation for each seed among the number of seeds based on the lateral angle, the cranial angle, the parallel translation, and the perpendicular translation; determining local minima based on the precise 3D transformation of each seed; determining a local minimum from the local minima using a steepest descent method; determining rotation angles and translation coordinates corresponding to the local minimum; and overlaying the 3D CT image data on the 2D fluoroscopic image data based on the determined rotation angles and translation coordinates.

9. The method of claim 8, wherein searching for the lateral angle and the cranial angle includes sampling values using a steepest descent method from the minima.

10. The method of claim 8, wherein determining the plurality of possible matchings for the roll angle based on the plurality of farther fluoro points includes:
  filtering out forbidden roll angles; and
  calculating a score for each matching among the plurality of possible matchings.

11. The method of claim 10, wherein selecting the matching among the plurality of possible matchings includes selecting the matching with the lowest score.

* * * * *